T. BROWN.
MANURE SPREADER.
APPLICATION FILED MAY 5, 1908.

907,124.

Patented Dec. 22, 1908.

Witnesses
R. D. Tolman
Penelope Comberbach

Inventor
Theophilus Brown.
By Rufus B. Fowler
Attorney

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

No. 907,124.

Specification of Letters Patent.

Patented Dec. 22, 1908.

Application filed May 5, 1908. Serial No. 431,007.

*To all whom it may concern:*

Be it known that I, THEOPHILUS BROWN, a citizen of the United States, residing at Worcester, in the county of Worcester and Commonwealth of Massachusetts, have invented a new and useful Improvement in Manure-Spreaders, of which the following is a specification accompanied by drawings forming a part of the same, in which—

Figure 1:
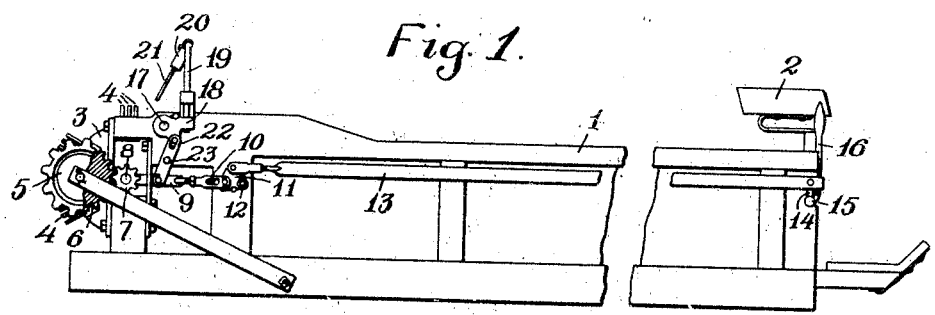
Figure 2:
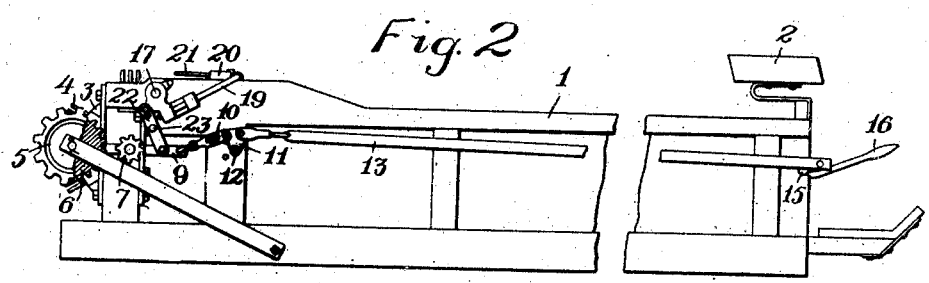
Figure 3:
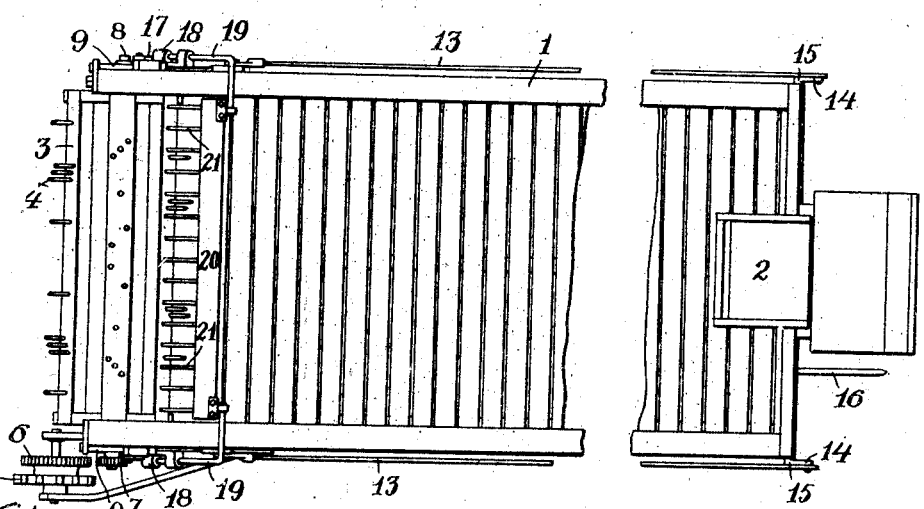

Figure 1 represents a side view of the body portion of a manure spreader containing a beater for distributing the manure and a pulverizing rake mounted in operative position above the beater. Fig. 2 represents the same with the pulverizing rake lowered into inoperative position; and Fig. 3 is a top view with the rake lowered in the position shown in Fig. 2.

Similar reference figures refer to similar parts in the different views.

The object of my present invention is to provide a pulverizing rake for that class of manure spreaders in which the beater is capable of being moved toward and away from the load, and further to provide means whereby a simultaneous movement of the beater and rake may be secured by the use of a single hand lever, and it consists in the construction and arrangement of parts as hereinafter described and set forth in the annexed claims.

In the accompanying drawings I have represented a detached view of the body portion of a manure spreader together with such connected operative parts as are necessary to illustrate the characters of my present invention.

Referring to the drawings 1 denotes the body portion of the manure spreader, 2 the seat for the driver, 3 a revolving beater journaled in suitable bearings supported by the body and provided with projecting teeth 4. Journaled in suitable bearings at the rear of the body is a sprocket wheel 5, to which rotary motion is imparted as the manure spreader travels over the ground by means of a sprocket chain connection, not herein shown or described as this method of rotating the beater is one in common use, and will be readily understood by those conversant with this class of machines. Rotated by the sprocket wheel 5 is a spur gear 6 which engages a pinion 7 on the shaft 8 of the beater. The beater shaft 8 is journaled in similar bearings on opposite sides of the spreader in duplicate bars 9, only one of which is represented in the accompanying drawings. The bars 9 slide in ways in the framework of the spreader and are connected by links 10 with bell cranks 11, pivoted at 12 on the sides of the body. The bell cranks 11 are connected by links 13 with radial arms 14 carried on a rocking shaft 15 journaled at the forward end of the body, and provided with a lever handle 16 in convenient position to be reached by the driver from the seat 2.

Pivoted upon studs 17 are rocking arms 18 in which are supported a frame 19 carrying a rake 20, extending transversely across the body of the spreader and provided with teeth 21. The rocking arm 18 is operatively connected with the sliding bar 9 by means of rocking levers 22 pivoted at 23 upon the side of the body portion, and having their opposite ends slotted to engage studs held in the arms 18 and the sliding bars 9. When the sliding bars 9 are moved to the rearward of the spreader in order to carry the pinion 7 into engagement with the driving gear 6, the arms 18 will be rocked through the connecting levers 22 so as to bring the frame 19 into an upright position, with the rake 20 supported above the beater and in proper position to cause the manure thrown from the load by the revolving beater to become pulverized as it passes through the teeth 21 of the rake. By depressing the lever handle 16, as shown in Fig. 2, the bell cranks 11 will be rocked to draw the sliding bars 9 forward to bring the pinion 7 out of engagement with the driving gear 6, and to draw the beater forward in the body of the spreader. This movement of the hand lever 16 also rocks the arm 18, to lower the frame 19 carrying the rake 20 into a horizontal position just above the sides of the body, as shown in Fig. 2. In the positions of the beater and rake, as represented in Fig. 2, the body of the spreader is prepared for loading, the beater then being in its most forward position and serving to retard the backward movement in the body of the load of manure.

When the spreader is ready for operation, the lever handle 16 is raised into the position shown in Fig. 1, thereby moving the beater rearward and freeing its teeth from the load of manure so that it may be readily rotated and, at the same time, carrying the pinion 7 into engagement with the driving gear. This rearward movement of the beater simultaneously moves the rake from its horizontal position into the vertical position shown in Fig. 1, in which the teeth 21 are in proper position to receive the impact of the manure as it is thrown by the revolving beater teeth.

I am aware that it is not new to equip a manure spreader with a revolving beater, capable of being moved rearward to free its teeth from the load of manure preparatory to the operation of the spreader, and I am also aware that it is not new to provide a manure spreader with a pulverizing rake mounted in proper position above the revolving beater, but I do not herein claim either of these features; the essence of my present invention consisting in operatively connecting the rearwardly moving beater with a rocking rake frame, whereby both the beater and rake may be simultaneously thrown into and out of their operative position by the action of a single lever.

I claim,

1. In a manure spreader, the combination with a body and a rotatable beater capable of a sliding movement toward and away from the front of the body, of a rake capable of a swinging movement into and out of its operative position, and means for swinging said rake conjointly with the sliding movement of said beater.

2. In a manure spreader, the combination with a body and a rotatable beater, of means for sliding said beater toward and away from the front of the body, a rake pivotally supported above the beater, a lever handle, and operative connections between said lever handle and the rake and beater, whereby the swinging movement of the rake corresponds with the sliding movement of the beater.

3. In a manure spreader, the combination with a body and a beater, of means for sliding said beater toward and away from the front of the body, a pivoted rake, and means for depressing said rake as the beater is moved toward the forward end of the body and for raising said rake as the beater is moved away from the forward end of the body.

4. In a manure spreader, the combination with a body and a beater capable of a sliding movement toward and away from the front of the body, of a rake pivotally supported, and means for simultaneously sliding said beater and swinging said rake.

5. In a manure spreader, the combination with a body and a rotatable beater, of beater supports capable of sliding toward and away from the front of the body, a pivoted rake, means for operatively connecting said rake with said beater supports, and means for sliding said beater supports.

6. In a manure spreader, the combination with a body and a beater capable of sliding toward and away from the front of the body, of a rake pivotally supported above the plane of the beater, slidable supports for the beater, an operative connection between said supports and said rake, and a lever handle for the conjoint movement of said beater supports and said rake.

Dated this second day of May 1908.

THEOPHILUS BROWN.

Witnesses:
PENELOPE COMBERBACH,
HENRY WOOD FOWLER.